(12) United States Patent
Nakamura

(10) Patent No.: US 6,954,926 B1
(45) Date of Patent: Oct. 11, 2005

(54) LABEL ADDRESS TRANSLATING DEVICE

(75) Inventor: Yoshinobu Nakamura, Inagi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/502,791

(22) Filed: Feb. 11, 2000

(30) Foreign Application Priority Data

Feb. 19, 1999 (JP) .......................................... 11-041430
Jan. 13, 2000 (JP) ..................................... 2000-009955

(51) Int. Cl.[7] .............................................. G06F 9/45
(52) U.S. Cl. ..................................... 717/151; 712/244
(58) Field of Search ................................ 717/136, 140, 717/151, 159–161; 712/244, 205, 216, 226–227; 711/202, 205–206, 208; 710/260

(56) References Cited

U.S. PATENT DOCUMENTS 5,375,213 A * 12/1994 Arai ........................... 711/208
5,878,238 A * 3/1999 Gan et al. ................... 710/314
5,907,708 A * 5/1999 Hohensee et al. ........... 712/244

FOREIGN PATENT DOCUMENTS

| JP | HEI 1-258029 | 10/1989 | |
| JP | 03246706 A * | 11/1991 | ........... G05B/19/05 |
| JP | 5-100864 | 4/1993 | |
| JP | 05100864 A * | 4/1993 | ............. G06F/9/45 |

* cited by examiner

Primary Examiner—Kakali Chaki
(74) Attorney, Agent, or Firm—Staas & Halsey LLP

(57) ABSTRACT

A label address translating device includes a unit for processing a program and judging, when processing the program, whether or not an address is obtained from a label, and a label address translating unit for reading the address corresponding to the label from a label table in an exception handling, and writing the address to the program. The program, after being processed by the label address translating device, comes into a state where the label is rewritten into the address. The rewriting into the address is performed in the exception handling, and a time needed for processing (compiling) the program is reduced.

4 Claims, 5 Drawing Sheets

FIG. 2

```
SOURCE CODE
LABEL_B=10+20
```
28

```
CODE BEFORE ADDRESS RESOLUTION IN PROCESS OF EXECUTION
FLD 10
FLD 20
FADD
FSTP DWORD PTR[0xFFFFFFFE] 'LABEL ID INSTEAD OF ADDRESS
```

FIG. 4

| LABEL ID | ADDRESS | LABEL NAME |
|---|---|---|
| 1) 0xFFFFFFFF | 0x00050002 | 'LABEL_A |
| 2) 0xFFFFFFFE | 0x00050006 | 'LABEL_B |
| 3) 0xFFFFFFFD | 0x0005000A | 'LABEL_C |

FIG. 5

```
CODE BEFORE ADDRESS RESOLUTION IN PROCESS OF EXECUTION
  FLD 10
  FLD 20
  FADD
  FSTP DWORD PTR[0x00050006]
```

LABEL ADDRESS TRANSLATING DEVICE

BACKGROUND OF THE INVENTION

1. Field of the Invention

The present invention relates to a label address translating device for obtaining an effective address (an absolute address, i.e., an intra-memory actual address) from a label I a program described in a predetermined language.

2. Related Background Art

In a program described in a computer language such as a C language, a BASIC language, a LIPS language and an APL language, a label address translation for obtaining an effective address from a label is executed with reference to a table showing a relationship between the label and the effective address.

For example, Japanese Patent Application Laid-Open Publication No.1-258029 discloses a data processor including a table showing a correspondence between a symbol string (labels) indicating respective identification names with respect to data areas and programs, and storage addresses in a storage device. This data processor obtains the storage address of the program or the data area from the correspondence table, and thus executes the program.

Further, in a program described in an interpreter language of being translated and interpreted per text, a label table showing a relationship between the label and the address is referred to each time the program is executed, and there are obtained effective addresses of a function and a variable which correspond to the label.

Moreover, in a program described in a compiler language in which all the texts are compiled and execution is thereafter done, the effective address is obtained from the label table each time the program is compiled.

The program described in the interpreter language, however, has such a problem that the label table is referred to with an interruption of the fundamental process during the execution of the program, and therefore a speed of executing the program might be delayed.

A problem inherent in the program described in the compiler language is that the compilation of the program takes much time.

A problem of a program described in a language containing the interpreter and compiler languages is that there might be a scatter in the execution speed.

SUMMARY OF THE INVENTION

It is a primary object of the present invention, which was devised to obviate the problems described above, to provide a label address translating device capable of increasing an executing speed with respect to a program described in an interpreter language and a compiling speed with respect to a program described in a compiler language, and preventing a scatter. in the executing speed with respect to a program described in a language (e.g., a Java language) containing both of the interpreter language and the compiler language.

To accomplish the above object, according to one aspect of the present invention, a label address translating device for obtaining an address from a label described in a program, comprises a program processing unit judging whether or not the address is obtained from the label when in the processing of the program, and a label address translating unit obtaining, when the program processing unit judges that the address is not obtained from the label, the address from the label in an exception handling, and writing the address to the program.

According to the present invention, when the program processing unit judges that the address is not obtained from the label during the execution of the program, the label address translating unit obtains the address from the label and writes the obtained address to the program. Thus, the address obtained from the label is written to the program, and thereafter the program to which the address has been written is processed (compiled). Hence, there is no necessity for acquiring the address from the label each time the program is processed (compiled).

Accordingly, if translating once the program described in the interpreter language, there is no necessity for obtaining the address from the label with an interruption of the fundamental process during the execution of the program. It is therefore feasible to increase the speed of executing the program. Further, as for the program described in the compiler language, the program compiling speed can be raised. Moreover, the scatter in the executing speed does not occur in the program described in the language containing both of the interpreter language and the compiler language.

Herein, the program processing unit and the label address translating unit may be constructed as functions actualized by, for example, a CPU executing the program for obtaining the address from the label. For instance, a main memory of a computer is stored with an exception handler, and this exception handler is executed by the CPU, thereby actualizing the label address translating unit.

The label address translating device according to the present invention may be constructed so that the label address translating unit may use a table showing a relationship between hi the label and the address.

With this contrivance, the address relative to the label can be obtained by retrieving the table with a label name and a label ID serving as a key.

The table is stored in, e.g., the main memory of the computer and accessed by the CPU.

The label address translating device according to the present invention may be constructed so that the program processing unit, when the address indicated by the label is not a real address, judges that the address is not obtained from the label.

Herein, the effective address may include an absolute address, an actual address in the memory, etc. but excludes an address inaccessible directly by the CPU.

According to another aspect of the present invention, a label address translating method of obtaining an address from a label described in-a program, comprises a first step of processing the program, a second step of judging whether or not the address is obtained from the label when the processing the program in the first step, a third step of obtaining, when judging in the second step that the address is not obtained from the label, the address from the label in an exception handling, and a fourth step of writing the address obtained in the third step to the program.

The label address translating method according to the present invention may be structured so that the third step involves reading the address to be obtained from a table showing a relationship between the label and the address.

The label address translating method according to the present invention may be structured so that the second step involves judging, when the address indicated by the label is not a real address, that the address is not obtained from the label.

According to a further aspect of the present invention, there is provided a readable-by-computer medium stored with a second program for making a computer function as a label address translating device for obtaining an address from a label described in a first program. The second program comprises a judging step of judging whether or not the address is obtained from the label when processing the first program, an obtaining step of obtaining, when judging in the judging step that the address is not obtained from the label, the address from the label in an exception handling, and a writing step of writing the address obtained in the obtaining step to the program.

The readably-by-computer medium may embrace, e.g., a CD-ROM, a magnetic disk such as a floppy disk, a magneto-optic disk such as an MO (magneto-optic), and an optical disk such as a PD (Phase change rewritable Disk).

BRIEF DESCRIPTION OF THE DRAWINGS

FIG. 2 is a diagram showing one example of a source code of a program shown in FIG. 1;

FIG. 3 is a diagram showing one example of a code obtained by a compilation of the program;

FIG. 4 is a diagram showing one example of a label table shown in FIG. 1;

FIG. 5 is a diagram showing one example of a code in which the address is rewritten by a label address translating unit illustrated in FIG. 1;

DESCRIPTION OF THE PREFERRED EMBODIMENTS

An embodiment of the present invention will hereinafter be described with reference to the accompanying drawings.

<Architecture of Label Address Translating Device>

Figure 1:
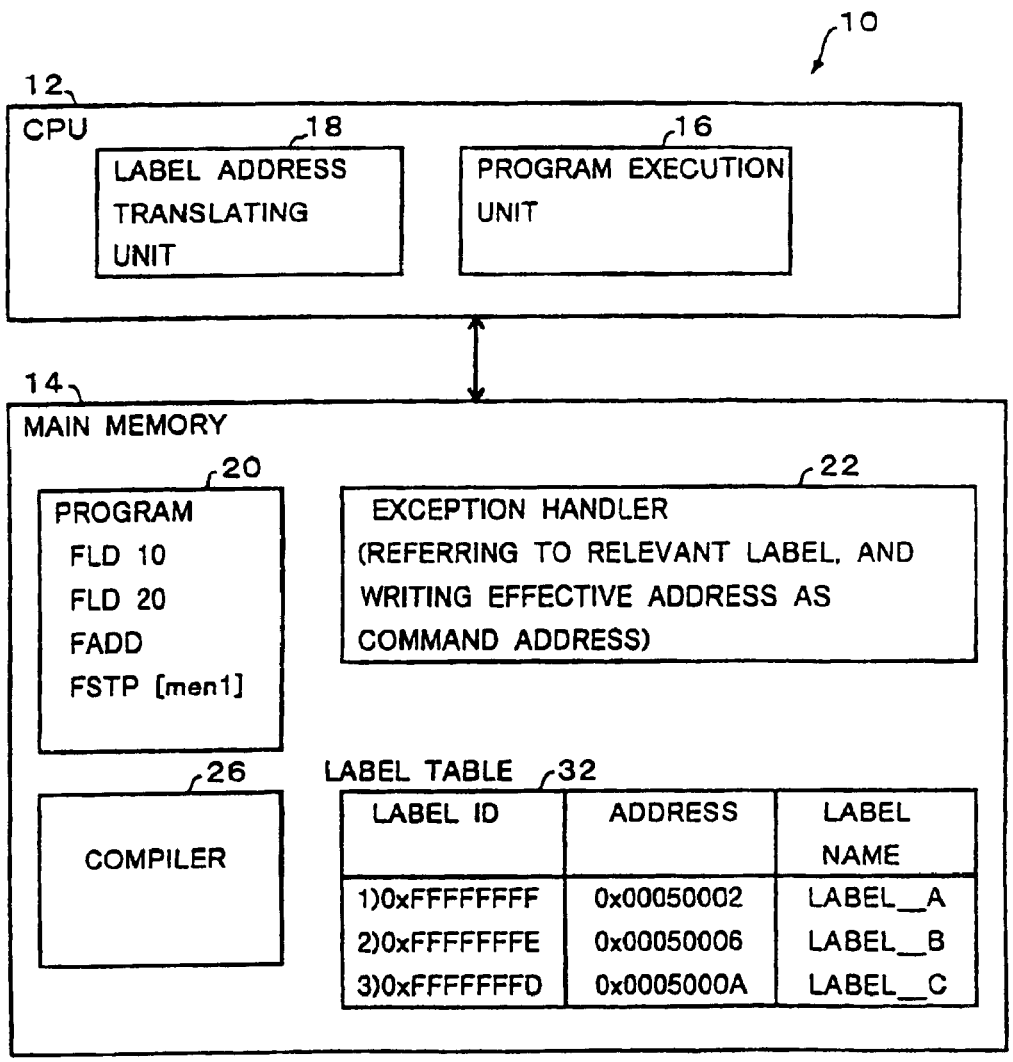
FIG. 1 is a diagram showing an architecture of a label address translating device in an embodiment of the present invention.

To start with, an architecture of a label address translating device in the embodiment of the present invention will be explained referring to FIGS. 2 through 5. FIG. 1 is a diagram showing a construction of a label address translating device 10. FIG. 2 is a diagram showing one example of a source code of a program 20 shown in FIG. 1. FIG. 3 is a diagram showing one example of a code obtained by compilation of the program. FIG. 4 is a diagram one example of a label table 32 illustrated in FIG. 1. FIG. 5 is a diagram showing one example of a code in which an address is rewritten by a label address translating unit 18 shown in FIG. 1.

As illustrated in FIG. 1, the label address translating device 10 is actualized by, e.g., a personal computer executing a label address translation program. The label address translating device 10 includes a CPU 12 and a main memory 14 accessed directly by the CPU 12.

The CPU 12 executes the label address translation program stored in a storage unit such as a ROM, a hard disk and a magnetic disk (none of those storage devices is shown herein, and the storage device corresponds to a readable-by-computer medium according to the present invention), thereby functioning as a label address translating unit (corresponding to a label address translating module) as well as a program executing unit 16 (corresponding to a program processing module).

Further, with the execution of the label address translation program by the CPU 12, an application program 20 as a processing target, an exception handler 22, a label table 32 (corresponding to a table) showing a relationship between the label and the address and a compiler 26, are developed on the main memory 14.

A source code 28 of the program 20 is described by use of a label name (LABEL_B) in a predetermined language, e.g., an interpreter language (see FIG. 2). Further, the source code 28 is encoded by an interpreter contained in the source code 28 (see FIG. 2). The encoded program 20 is developed on the main memory 14 and executed by the CPU 12.

In a code 30 shown in FIG. 3, [FLD 10] and [FLD 20] indicate loading of "10" and "20", [FADD] indicates adding loaded "10" and "20", and [FSTP DWORD PTR [0xFFFFFFFE]] indicates storing an added result in an address "0xFFFFFFFE". Moreover, the invalid data "0xFFFFFFFE" as the address in which the added result should be stored, i.e., the data ruled out of an accessible memory range when executing the program 20, is defined in the code 30. The CPU 12 is, when detecting the invalid data, set to execute an exception handling. The exception handling has a higher execution speed than a normal program execution process, and is executed in advance of the fundamental execution process.

The label table 32 is, as shown in FIG. 1 or 4, stored with label Ids, effective addresses that should be referred to by a command, and label names described in the source code 28. The label table 32 is created during a compilation of the program.

Note that what is typical as a program edit tool of the interpreter language at the present is that an intermediate code is compiled for the duration of a compilation of a source program by the user in order to increase as processing speed in a posterior execution process. The compile process is carried out during the editing of the source program also in the edit tool of the interpreter language in this embodiment.

The label table 32 shows a corresponding relationship between the label ID "0xFFFFFFFE" defined as the address in the code shown in FIG. 3, the effective address "0x00050006" and the label name "LABEL B". That is, the (effective) address can be obtained by referring to the label table 32, wherein the label name and the label ID described in the program 20 serve as a key. A method of an address modification of the effective address may be based on either absolute addressing or relative addressing.

Referring back to FIG. 1, the program execution unit 16 executes the program 20 developed on the main memory 14 in accordance with an execution command inputted by an operator.

Further, the program executing unit 16 executes a process of referring to the address during the execution of the program 20. For instance, the program executing unit 16 performs a certain arithmetic operation and stores an arithmetic result thereof in a predetermined address of the memory. At this time, the program executing unit 16, when recognizing that an invalid piece of data (invalid data) is described in the program 20, performs the exception handling (i.e., the label address translation process) other than the normal processes of the program 20.

The label address translating unit 18, when executing the exception handling, starts up an exception handler 22. The exception handler 22 retrieves the label table 32, in which an address of a command (e.g., [FSTP]) becoming a target for the exception handling and the label described in the source code 28 of the program, serve as a key. The exception handler 22 thus reads the relevant effective address from the label table 32.

Thereafter, the label address translating unit 18 sets the obtained effective address in the program 20. For example, [FSTP DWORD PTR[0xFFFFFFFE]] shown in FIG. 3 is, as shown in FIG. 5, rewritten into [FSTP DWORD PRT [0x00050006]]. This piece of data "0x00050006" indicates an effective address of the memory.

According to the label address translating device 10, when recognizing the invalid data during the execution of the program 20 by the program execution unit 16, the label address translating unit 18 starts up the exception handler 22. Subsequently, the exception handler 22 obtains the effective address from the label defined in the program 20 by referring to the label table 32 and sets the thus obtained effective address in the program 20. Namely, the CPU 12, upon recognizing the invalid data, executes the exception handling and the normal processes thereafter.

When the effective address is thereby set in a command (such as storing the arithmetic result in the predetermined address on the memory) of referring to the address, thereafter, the exception handling for translating the label into the address is not required to be done with respect to that command. Accordingly, it is feasible to speed up the execution of the program 20 and the translation as well.

Further, the process of obtaining the effective address from the label ID is carried out as an exception handling by the CPU 12 (particularly by the program executing unit 16). The exception handling is executed by a method different from the normal process at a higher execution speed than the normal process. Hence, a translation speed can be made higher than in the case of implementing the label address translation process in the same way as the normal process.

<Operational Example of Label Address Translating Device>

Figure 6:
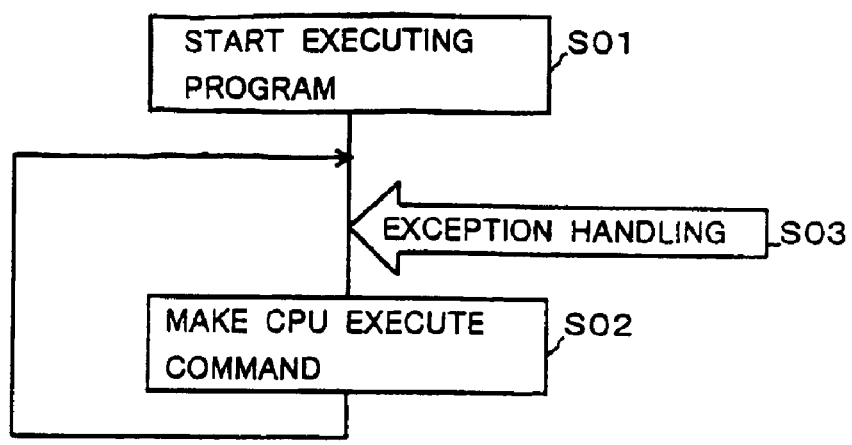
FIG. 6 is a flowchart showing a process by the label address converting device illustrated in FIG. 1.
Figure 7:
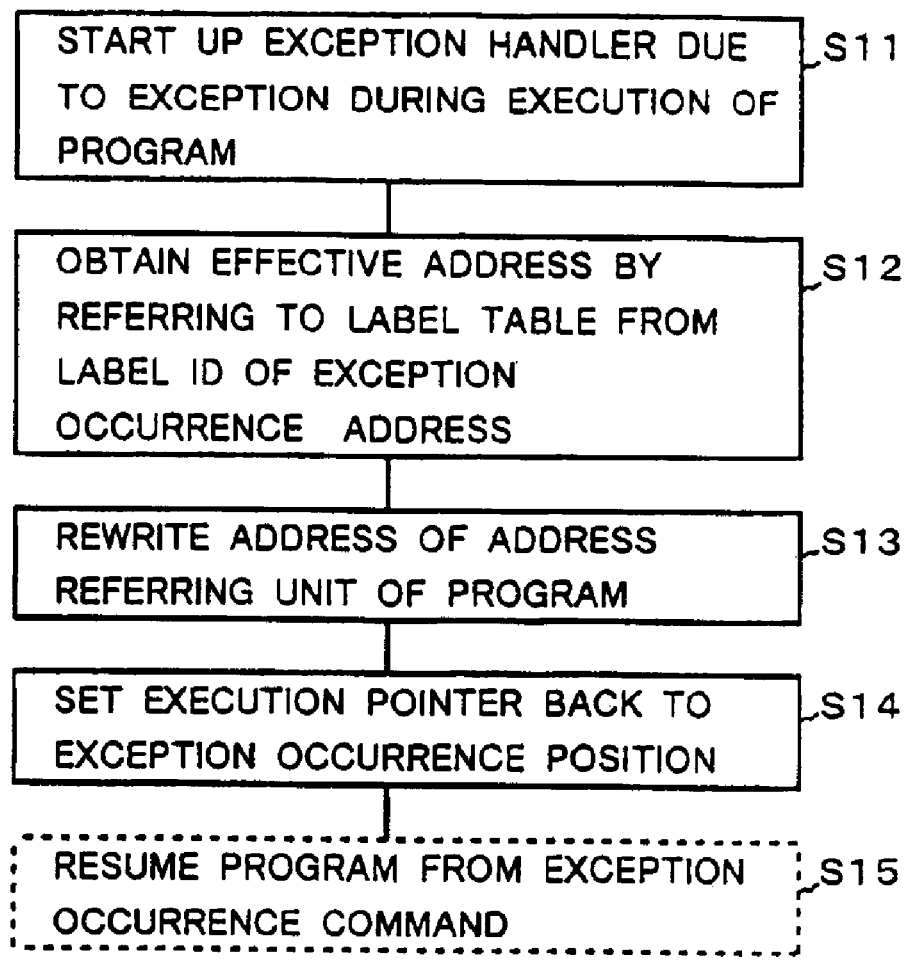
FIG. 7 is a flowchart showing an exception handling shown in FIG. 6.

Next, an operational example of the label address translating device 10 described above will be explained. FIG. 6 is a flowchart showing the processes by the label address translating device 10 illustrated in FIG. 1. FIG. 7 is a flowchart of the exception handling shown in FIG. 6.

As shown in FIG. 6, upon a start of executing the program 20 (S01), the CPU 12 implements the command described in the program 20 (S02). At that time, the CPU 12, when recognizing the invalid data, executes the label address translating process as the exception handling (S03).

As shown in FIG. 7, the CPU 12, upon recognizing the invalid data during the execution of the program 20, starts up the exception handler 22 (S11). The exception handler 22 refers to the label table 32, thereby obtaining the effective address, wherein the address of the command in which the invalid data is described (or the label ID of this command) serves as a key (S12). Subsequently, the CPU 12 rewrites the address described in that command (which is, e.g., an address for storing the arithmetic result) into the effective address from the invalid data (S13).

Thereafter, the CPU 12 sets an execution pointer (viz., the process) back to the command by which the exception handling is recognized (S14). The address described in that command has been rewritten into the effective address from the invalid data, and hence the CPU 12 executes the command based on the rewritten address (for instance, stores the arithmetic result in a predetermined address), and further executes commands thereafter (S15).

According to the label address translating device 10 in the embodiment discussed above, the label table 32 showing the relationship between the labels and the effective addresses are referred to, whereby each of the labels described in the program 20 is rewritten into the effective address. The program 20 as a target for processing eventually falls into a state where the effective address is rewritten therein instead of the label. Hence, in the execution (compilation) of the program 20 after being rewritten, since there is no necessity for translating the label into the effective address, it is possible to omit the process of translating the label into the effective address.

Accordingly, if the program 20 is described in the interpreter language, the speed of executing the program 20 can be increased. If the program 20 is described in the compiler language, a translation speed of the program 20 can be increased. If the program 20 is described in a language (e.g., Java language) containing both of the interpreter language and the compiler language, it is feasible to restrain a scatter in the execution speed between the commands contained in the program 20.

What is claimed is:

1. A device for executing a program including at least one source code with a label, comprising:

a translating unit translating a source code with a label into a code including a memory address corresponding to the label, wherein said translating unit sets the memory address in the code to an address value for performing exception handling:

an executing unit to execute the code;

a label table storing a real memory address value of a memory, which is used for executing the code; and an exception handling unit starting only when said executing unit detects the address value for performing exception handling in the code during executing the code, and performing exception handling for re-writing the address value for performing exception handling in the code into the real memory address value after reading out the real memory address value from said label table, based on the address value for performing exception handling or the label included in the source code, so that when said executing unit detects the real memory address value in the code, said executing unit executes the code, without performing the exception handling.

2. A method for executing a program including at least one source code with a label, comprising:

translating a source code with a label into a code including a memory address corresponding to the label, and setting the memory address in the code to an address value for performing exception handling;

executing the code; and starting exception handling only when the address value for performing exception handling in the code is detected during executing the code, said exception handling including reading out a real memory address value of a memory, which is used for executing the code, from a label table storing the real memory address value, based on the address value for performing exception handling or the label included in the source code, and re-writing the address value for performing exception handling in the code into the real memory address value, so that when the real memory address value in the code is detected during executing the code, the code is executed without performing said exception handling.

3. A computer readable medium storing a program for executing a target program including at least one source code with a label, said program comprising the steps of:

translating a source code with a label into a code including a memory address corresponding to the label, and setting the memory address in the code to an address value for performing exception handling;

executing the code; and starting exception handling only when the address value for performing exception handling in the code is detected during executing the code, said exception handling including reading out a real memory address value of a memory, which is used for executing the code, from a label table storing the real memory address value, based on the address value for performing exception handling or the label included in the source code, and re-writing the address value for performing exception handling in the code into the real memory address value, so that when the real memory address value in the code is detected during executing the code, the code is executed without performing said exception handling.

4. A computer program for executing a target computer program including at least one source code with a label, said computer program comprising the steps of:

translating a source code with a label into a code including a memory address corresponding to the label, and setting the memory address in the code to an address value for performing exception handling;

executing the code; and starting exception handling only when the address value for performing exception handling in the code is detected during executing the code, said exception handling including reading out a real memory address value of a memory, which is used for executing the code, from a label table storing the real memory address value, based on the address value for performing exception handling or the label included in the source code, and re-writing the address value for performing exception handling in the code into the real memory address value, so that when the real memory address value in the code is detected during executing the code, the code is executed without performing said exception handling.

* * * * *